United States Patent [19]

Scholz et al.

[11] Patent Number: 5,718,958
[45] Date of Patent: Feb. 17, 1998

[54] REPULPABLE PRESSURE-SENSITIVE ADHESIVE CONSTRUCTIONS HAVING MULTIPLE LAYERS

[75] Inventors: William Scholz; Luigi Sartor, both of Pasadena, Calif.

[73] Assignee: Avery Dennison Corporation, Pasadena, Calif.

[21] Appl. No.: 482,155

[22] Filed: Jun. 7, 1995

[51] Int. Cl.$^6$ .................................................. C09J 7/04
[52] U.S. Cl. ...................... 428/40.1; 40/299; 428/41.3; 428/41.5; 428/41.7; 428/41.8; 428/41.9; 428/212; 428/213; 428/214; 428/343; 428/354; 428/355
[58] Field of Search ............... 428/40.1, 41.9, 428/41.3, 41.5, 41.7, 41.8, 212, 213, 214, 343, 354, 355; 40/299

[56] References Cited

U.S. PATENT DOCUMENTS

| | | | |
|---|---|---|---|
| 1,322,257 | 11/1919 | Miller | 428/354 |
| 3,464,842 | 9/1969 | Jackstadt | 428/195 |
| 3,547,852 | 12/1970 | Burke, Jr. | 524/320 |
| 3,627,559 | 12/1971 | Chen | 428/354 |
| 3,843,480 | 10/1974 | Dreher | 428/354 |
| 4,045,600 | 8/1977 | Williams | 427/379 |
| 4,086,388 | 4/1978 | Brown | 428/315 |
| 4,112,177 | 9/1978 | Salditt et al. | 428/304 |
| 4,260,659 | 4/1981 | Gobran | 428/217 |
| 4,284,681 | 8/1981 | Tidmarsh et al. | 428/246 |
| 4,335,171 | 6/1982 | Zenk | 428/40.1 |
| 4,374,883 | 2/1983 | Winslow | 428/40.1 |
| 4,413,082 | 11/1983 | Gleichenhagen et al. | 524/343 |
| 4,543,139 | 9/1985 | Freedman et al. | 428/352 |
| 4,577,204 | 3/1986 | Shibata et al. | 428/913 |
| 4,581,281 | 4/1986 | Gerace | 428/215 |
| 4,822,676 | 4/1989 | Mudge | 428/343 |
| 4,892,917 | 1/1990 | Mudge | 526/318 |
| 4,894,259 | 1/1990 | Kuller | 427/208.8 |
| 4,895,747 | 1/1990 | Birkholz | 428/40.9 |
| 4,908,268 | 3/1990 | Mudge | 428/343 |
| 4,939,220 | 7/1990 | Mudge | 428/318.43 |
| 4,968,558 | 11/1990 | Briddell et al. | 428/345 |
| 5,000,810 | 3/1991 | Silverstein | 428/204 |
| 5,089,320 | 2/1992 | Straus et al. | 428/216 |
| 5,189,126 | 2/1993 | Bernard | 526/261 |
| 5,196,504 | 3/1993 | Scholz | 526/318.4 |
| 5,232,958 | 8/1993 | Mallya et al. | 522/107 |
| 5,248,808 | 9/1993 | Bernard et al. | 560/160 |
| 5,290,842 | 3/1994 | Sasaki et al. | 524/271 |
| 5,302,649 | 4/1994 | Sasaki et al. | 524/274 |
| 5,304,418 | 4/1994 | Akada et al. | 428/345 |
| 5,322,876 | 6/1994 | Sasaki et al. | 524/366 |
| 5,326,644 | 7/1994 | Scholz et al. | 426/514 |
| 5,354,600 | 10/1994 | Fisher et al. | 428/215 |

FOREIGN PATENT DOCUMENTS

| | | |
|---|---|---|
| 0103407 | 8/1986 | European Pat. Off. . |
| 2 206916 | 10/1972 | Germany . |
| 5 046091 | 2/1993 | Japan . |
| 9322391 | 11/1993 | WIPO . |

OTHER PUBLICATIONS

Technical Data Sheet from Schenectady International for Acrylic Polymer HRJ–4527.
Technical Data Sheet from Schnectady International for Acrylic Polymer HRJ–10753.
Technical Data Sheet from Schenectady International for Acrylic Polymer HRJ–12531.

*Primary Examiner*—Nasser Ahmad
*Attorney, Agent, or Firm*—Knobbe Martens Olson & Bear LLP

[57] ABSTRACT

A pressure-sensitive adhesive construction repulpable in paper recycling operations, comprising a facestock which is repulpable; a dispersible pressure-sensitive adhesive comprising tacky emulsion polymers dispersible in water; and a nondispersible pressure-sensitive adhesive comprising tacky emulsion polymers not dispersible in water, wherein, on the facestock, the dispersible pressure-sensitive adhesive is closer to the facestock than the nondispersible pressure-sensitive adhesive, thereby improving both adhesive performance and recyclability.

11 Claims, 2 Drawing Sheets

REPULPABLE PRESSURE-SENSITIVE ADHESIVE CONSTRUCTIONS HAVING MULTIPLE LAYERS

FIELD OF THE INVENTION

This invention relates to repulpable pressure-sensitive adhesive constructions having multiple layers. In particular, the invention relates to such repulpable pressure-sensitive adhesive constructions having improved adhesive characteristics and improved dispersibility for enhanced recyclability in paper recycling operations.

BACKGROUND OF THE INVENTION

Wastepaper containing pressure sensitive labels and tapes are generally considered nonrepulpable in paper recycling operations due to the presence of the adhesive. These adhesives are commonly used in label and tape products and are generally composed of acrylic and rubber (block copolymer) based polymers. These adhesives will firmly adhere to the fiber matrix of paper and are neither water soluble nor water dispersible which complicates their effective removal during the paper recycling operation.

During recycling processes, conventional adhesives tend to agglomerate and form globules, called "stickies." These stickies are contaminants which interfere with the paper pulping and de-inking operations and can deposit on the felts, wires, and drier cans of paper machines, thereby causing functional and cosmetic flaws in the resulting paper. Thus, waste paper containing conventional adhesives are generally not considered repulpable. They are usually landfilled. With the possibility of legislative mandates requiring the use of repulpable adhesives, banning paper from landfills, and an increasingly demanding environmentally sensitive public, introduction of repulpable adhesives to the marketplace would be highly beneficial.

In order to render adhesives repulpable in paper mills, several approaches have been exploited. One approach has been to use water dispersible adhesive technology. For example, U.S. Pat. Nos. 4,482,675, 4,569,960 and 5,196,504 disclose water dispersible adhesives made of acrylic copolymers. However, these polymers tend to have insufficient adhesive characteristics for many applications, as measured in low values in looptack and peel testing.

Another approach to the development of repulpable adhesives has been to use water soluble adhesive technology. For example U.S. Pat. Nos. 4,413,082 and 4,442,258, disclose water soluble adhesives made of butyl acrylic (BA)/acrylate acid (AA) based polymers. However, these adhesives suffer from poor shelf life, poor humidity and/or heat-aged performance, and a propensity to bleed into the paper facestock over time. Further, water soluble adhesives create a secondary problem in paper recycling operations. Thus, it is difficult to remove dissolved polymer from treated water, causing environmental problems when water is discharged from the mill.

SUMMARY OF THE INVENTION

One aspect of the present invention is a pressure-sensitive adhesive construction repulpable (or recyclable) in paper-recycling operations, comprising: a facestock which is repulpable; a dispersible pressure-sensitive adhesive comprising tacky emulsion polymers dispersible in water; and a nondispersible pressure-sensitive adhesive comprising tacky emulsion polymers not dispersible in water. Preferably, the dispersible pressure-sensitive adhesive is closer to the facestock than the nondispersible pressure-sensitive adhesive.

In the above construct, the weight ratio of the nondispersible pressure-sensitive adhesive to the dispersible pressure-sensitive adhesive is preferably 1/7 to 1/2, more preferably 1/4 to 1/5, for the aforesaid purpose. The coat-weight of the dispersible pressure-sensitive adhesive is preferably 15 g/m$^2$ to 30 g/m$^2$, more preferably 18 g/m$^2$ to 22 g/m$^2$, and that of the nondispersible pressure-sensitive adhesive is preferably 2 g/m$^2$ to 15 g/m$^2$, more preferably 4 g/m$^2$ to 6 g/m$^2$.

The dispersible pressure-sensitive adhesive preferably contains emulsion polymers formed by emulsion polymerization and have a backbone of from about 80% to about 90% by weight of nonacid monomers, interpolymerized with from about 10% to about 20% with a blend of acrylic acid monomers. As a nondispersible pressure-sensitive adhesive, a general purpose permanent product can be used.

Further, it is preferred that the dispersible pressure-sensitive adhesive and the nondispersible pressure-sensitive be coatable from the same die, so that the dual layer adhesive can be easily and efficiently produced using a dual die coating method.

The adhesive of the present invention can be used in the linerless stamp application giving an adhesive that can be sufficiently removed from the paper pulp during de-inking to be considered repulpable.

DETAILED DESCRIPTION OF THE PREFERRED EMBODIMENTS

Figure 1:
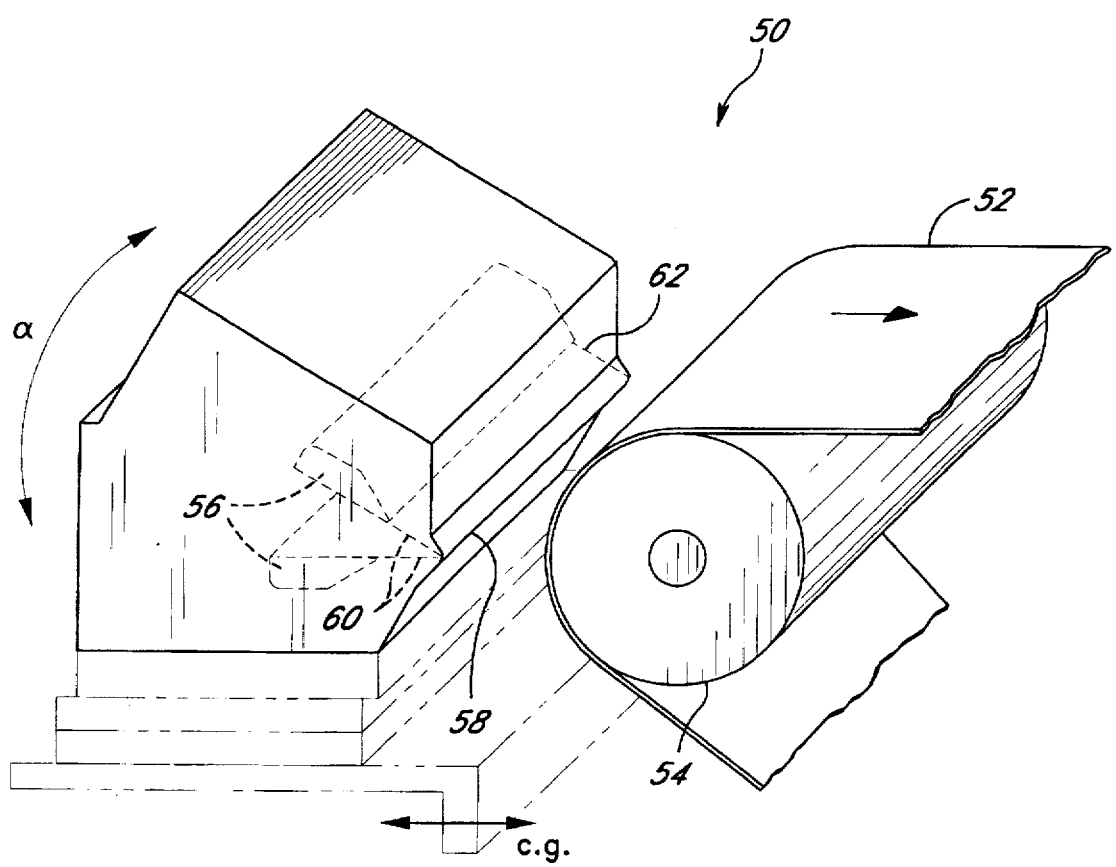
FIG. 1 is a schematic slanting view (a part) showing one embodiment of a dual die coating system used in the present invention.

The present invention results in pressure-sensitive adhesive constructions having both good recyclability and adhesive performance. The adhesive constructs of the present invention disperse in the recycling process water medium and can be effectively removed from the pulp using washing and/or floatation removal technologies. In other words, the present invention produces significantly improved dispersibility for enhanced recyclability in paper recycling operations, as well as improved adhesive performance values as measured by looptack and peel testing.

The present invention exploits adhesive constructions having multiple layers. One of these layers is a dispersible pressure-sensitive adhesive made up of tacky emulsion polymers dispersible in water. Another of these layers is a nondispersible pressure-sensitive adhesive made up of tacky emulsion polymers not dispersible in water. The dispersible pressure-sensitive adhesive is applied to the label at a position closer to the facestock of the label than the nondispersible pressure-sensitive adhesive. While good adhesive performance and good recyclability (i.e., repulpability) have heretofore been mutually exclusive, we have found that use of a combination of dispersible and nondispersible adhesives can achieve both of these results. That is, the adhesive constructs of the present invention give improved adhesion performance relative to the dispersible technology and improved dispersibility relative to the conventional technology. Although the dispersibility of the construct is not always as effective as that of the dispersible adhesive alone, the dispersibility is sufficient for efficient removal during de-inking operations.

DISPERSIBLE PRESSURE-SENSITIVE ADHESIVE

In the present invention, any dispersible emulsion polymer systems which are functional as pressure-sensitive adhesives (PSAs) can be used. Preferred are emulsion polymers which not only disperse in the paper fiber adequately during the repulping process, but also are removable from the paper fiber; otherwise, paper quality is reduced. Further, emulsion polymers which are resistant to loss of adhesive properties on exposure to high humidity are preferred.

For example, water dispersible pressure-sensitive adhesives can be those formed by emulsion polymerization and having a backbone of from about 80% to about 90% by weight of nonacid monomers, predominantly alkyl acrylate, interpolymerized with from about 10% to about 20% with a blend of acrylic acid with at least one oleophilic unsaturated carboxylic acid in the presence of a chain transfer agent. The repulpable pressure-sensitive adhesives have a glass transition temperature in the range of about $-15°$ C. to $-50°$ C., and are formed in the presence of nonionic and anionic surfactants. For detail concerning these adhesives, U.S. Pat. No. 5,196,504 "Repulpable Pressure-Sensitive Adhesive Compositions" is incorporated herein by reference.

Other tacky water-dispersible pressure-sensitive adhesives can be those formed by emulsion polymerization of from about 55% to about 90% by weight alkyl acrylate, interpolymerized with from about 10% to about 20% of hydroxyethyl methacrylate. The polymerization preferably occurs at least in part in the presence of a chain transfer agent, preferably n-dodecyl mercaptan, and chain transfer agent. These agents are present in an amount sufficient to provide a repulpable pressure-sensitive adhesive. This type of adhesive is compatible with alkaline phosphored postage stamp paper. The repulpable pressure-sensitive adhesives have a glass transition temperature in the range of about $-15°$ C. to $-50°$ C., and are formed in the presence of nonionic and anionic surfactants. For detail, U.S. Pat. No. 5,326,644 "Repulpable Pressure-Sensitive Adhesive Compositions" is incorporated herein by reference.

To select appropriate dispersible polymers, assessment under the conditions stipulated in TAPPI (Technical Association of the Pulp & Paper Industry) Useful Methods 204 and 213 (described in the 1991 ed.) can be used. Since the conditions employed in TAPPI Useful 204 and 213 are not identically commensurate with those in the paper recycling industry, dispersibility of polymers should be finally assessed using simulated or commercial paper recycling operations.

NONDISPERSIBLE PRESSURE-SENSITIVE ADHESIVE

Acrylic and rubber-based adhesives (block copolymer) are commonly used in tapes or labels for paper as nondispersible PSAs which are not compatible with paper recycling operations, but have sufficient adhesive characteristics. In view of productivity and uniform application, a dual die process described in detail hereinbelow can be used for application of the dispersible and nondispersible adhesives.

Thus, in certain embodiments of the invention, one of the preferred qualities of the nondispersible adhesive is that it be coatable from the same die as the repulpable adhesive selected. Conditions of the polymers for them to be "coatable from the same die" include such that described later under the heading "DUAL DIE COATING METHOD."

The viscosities of dispersible PSA and nondispersible PSA, and the speed of forming layers are also parameters to form dual layers composed of dispersible and nondispersible PSAs. These parameters can be adjusted depending on the type of apparatus and layer structure. Hot melt products such as tackified block copolymers (such as Kraton, manufactured by Shell Oil Company, Houston, Tex.) can be used as nondispersible pressure-sensitive adhesives. In any case, the nondispersible adhesive is preferably an aggressive general purpose permanent product such as S246 available commercially from Avery Dennison Corporation (a Delaware corporation having a place of business, inter alia, in Pasadena, Calif.).

DUAL-LAYER ADHESIVE

The present invention achieves both good adhesive characteristics and recyclability in paper recycling operations by laminating a nondispersible PSA on a dispersible PSA applied on a facestock. The amount of dispersible PSA applied on a facestock is normally 15 $g/m^2$ to 30 $g/m^2$, preferably 18 $g/m^2$ to 22 $g/m^2$. The amount of nondispersible PSA applied on the dispersible PSA is normally 2 $g/m^2$ to 15 $g/m^2$, preferably 4 $g/m^2$ to 6 $g/m^2$. A 4 $g/m^2$ coatweight is practically the minimum layer of nondispersible adhesive tested on the industrial scale. The ratio of nondispersible PSA to dispersible PSA is normally 1/7 to 1/2, preferably 1/4 to 1/5, so that the finally obtained dual-layer adhesive can have heretofore mutually exclusive aspects, i.e., good adhesive characteristics and recyclability in paper recycling operations.

Unexpectedly, by using a dual layer PSA of the present invention, adhesive characteristics are actually improved, especially on cardboard. Since cardboard is the most important substrate for industrial applications and for recycling, the present invention provides a significant unexpected advantage over conventional adhesive constructs.

There is no absolute standard to judge the recyclability of adhesives. Acceptability depends on the recycling process and the equipment used, the initial contamination level of the incoming wastepaper stream, and the intended quality of the outgoing pulp. Recyclability may be assessed based on TAPPI Useful Methods 204 and 213. However, the TAPPI conditions are not commensurate with those in industrial pulping operations, and thus these test scores do not necessarily assess the actual recyclability. In Examples which will be described later, other methods to evaluate recyclability were employed which are believed to be more accurate and predictable.

OTHER ASPECTS

Layer structures other than a dual layer can be employed in the present invention. That is, a dispersible PSA can be composed of multiple layers of different type dispersible emulsions, and a nondispersible PSA can also be composed of multiple layers of different type nondispersible emulsions. Further, a barrier coating can be formed on a facestock.

As a facestock, any type can be used depending on the intended use of the label or tape. For recycling, paper facestocks are preferred. For longer shelf life or higher resistance to humidity, facestocks coated with styrene butadiene rubber (SBR), starches, polyether and polyvinylalcohol polymers, clays, and other materials commonly used to coat papers are preferred.

DUAL DIE COATING METHOD

The dual-layer PSA of the present invention can be manufactured in accordance with many methods well known to those of ordinary skill in the multi-layer coating art. The dual-layer PSA can comprise two or more layers applied to an appropriate substrate by, for example, separately coating each layer to different substrates (a backing and a facestock), drying the multiple coatings, and then laminating them together to form an integral product, i.e., two-pass type operations. Other known methods of simultaneous or near-simultaneous coating include slide coating, multilayer die coating, or die/slide combination coating. The best way to produce the dual-layer PSA of the present invention is the use of a dual die coating method. The details thereof will be described below.

One preferred method of manufacture uses a multilayer die 50 such as that illustrated in FIG. 1. Although the die shown in FIG. 1 illustrates the application of two coating layers to a substrate 52, it will be understood that the principles of this method are equally applicable to a plurality of layers in addition to two. In accordance with standard practice, the substrate, which in this case preferably comprises silicone coated paper, is referred to as a "web" and is formed into a long roll. The web 52 travels around a back-up roll 54 as it passes the distal end of the multilayer die 50. As shown in FIG. 1, it will be understood that both the die 50 and the web 52 have substantially equal width such that the entire width of the substrate is coated in one pass by the fluid flowing out of the die 50 and onto the web 52. In this case, two separate fluid layers are flowing out of manifolds 56 formed in the die and along individual slots 60 which are defined by the die's distal lands 62. The slots 50 each communicate with the interface between the web 52 and the distal most tips 58 of the die 50. These tips are referred to as the "die lips" 58 and are illustrated and described in more detail in connection with FIG. 2 below.

Figure 3:
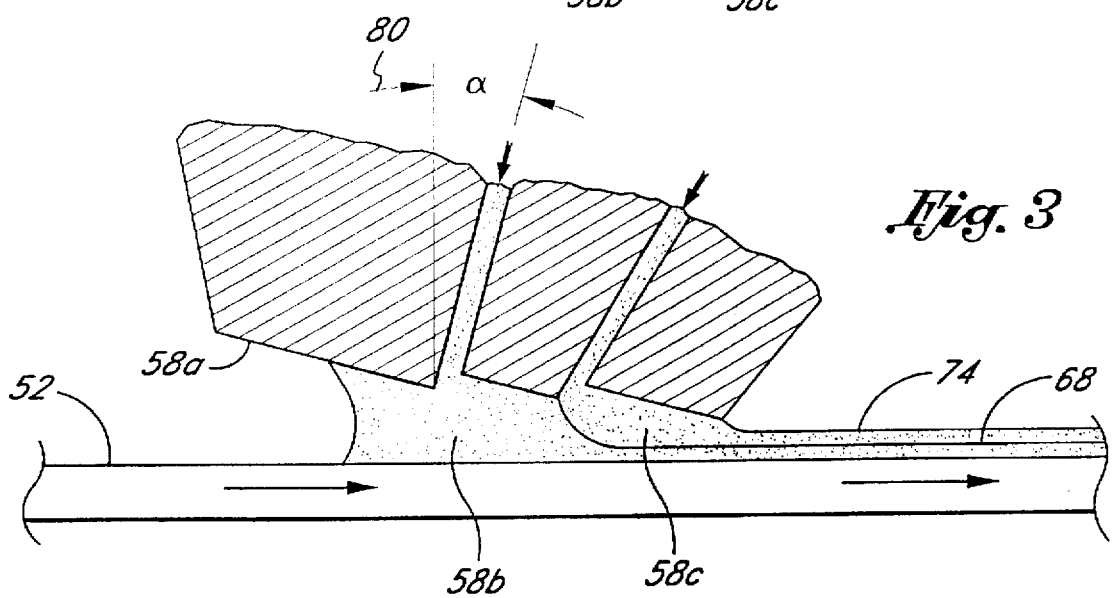
FIG. 3 is a schematic enlarged vertical cross-sectional view illustrating another embodiment of coating operation using the dual die coating system.

The multilayer die 50 is modular, thus allowing for variations in the individual slots 60 and lip 58 configurations without necessitating modifications to the other slots and lips. Thus, these geometries can be adjusted in order to achieve successful coating. Other variables include the "coating gap" (e.g.) and the "angle of attack" (a) of the die. As illustrated in FIG. 1, the coating gap is the distance that the lips 58 are set back from the web. The angle of attack (a) is the degree of angular adjustment of the lip surfaces and of the entire die with respect to the outer pointing normal of the web as illustrated in FIG. 3. Another variable is the web speed which may vary between 50–1,000 feet per minute, and more.

Either one of two die coating methods may be utilized: interference coating or proximity coating. In the former case, the lips 58 of the die actually are pressed forward in the direction of the web 52, but do not contact the web nor cause any damage thereto, because they hydroplane on a thin layer of coating material. However, the pressure may actually cause the back-up roll 54 (typically constructed from a hard rubber material) to deform in order to relieve the pressure of the die against the lips 58. In proximity coating, the lips 58 of the die 50 are positioned a precise distance from the web 52 and are not pressed forward toward the web. The back-up roll 54 is typically constructed from a stainless steel material which allows for precision in the circumference of the roll and minimizes roll run-out. The method described herein can be successfully utilized with either type of coating technique.

Thus, since very thin layers of high viscosity adhesives are being coated at relatively high web speeds, the process must be carefully controlled.

Figure 2:
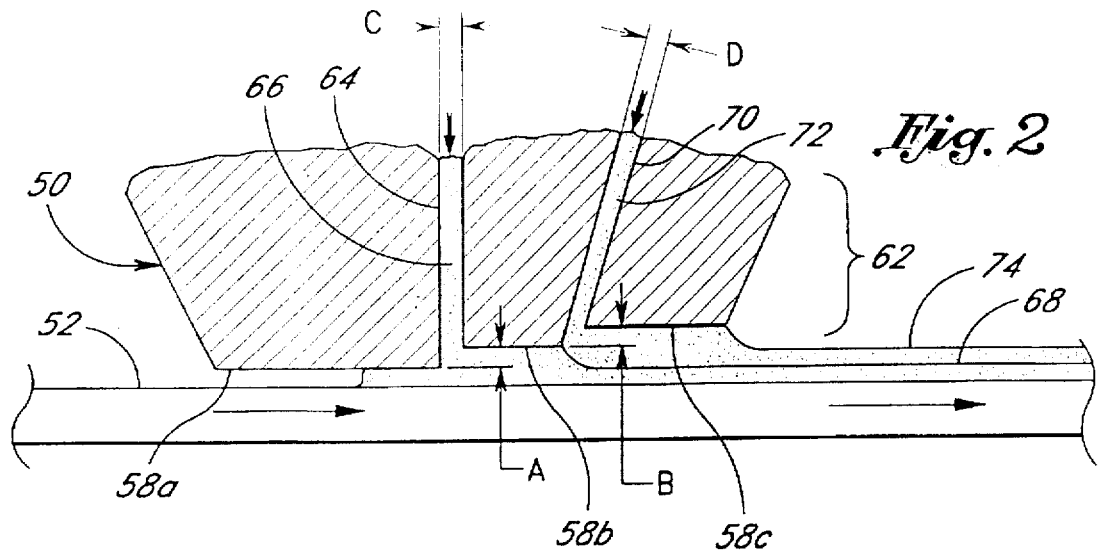
FIG. 2 is a schematic enlarged vertical cross-sectional view illustrating one embodiment of coating operation using the dual die coating system shown in FIG. 1.

Such control is accomplished with the present multilayer die coating technique, in part due to the geometry and configuration of the die lips 58. Referring to FIG. 2, there is shown a close-up view of the distal most tips 62 of the multilayer die of FIG. 1, including the lips 58 associated with each slot, showing the interface or coating gap with respect to the web 52. With respect to FIG. 2, it should be noted that, for ease of illustration, the die 50 is shown rotated 90° from the position shown in FIG. 1. Moreover, the web 52 is shown in a horizontal arrangement, when in actuality, there may be a slight curvature to the web 52 and back-up roll (not shown) at this point; however, the distances involved are so short that a good approximation of the fluid dynamics can be achieved by assuming a horizontal web 52.

For consistent reference, the individual lips 58 of the multilayer die 50 shall be referred to with respect to the direction of travel of the web 52. For example, the lip 58a shown to the left in FIG. 2 will be referred to as the "upstream lip", while the right-most lip 58c shall be referred to as the "downstream lip". Thus, the "middle lip" 58b will have that same reference. Accordingly, the upstream and middle lips 58a, 58b define an upstream feed gap 64 through which an adhesive material 66 flows onto the web 52 to form a bottom adhesive layer 68 of a multilayer adhesive product. Likewise, the middle lip 58b and the downstream lip 58c together form a slotted feed gap 70 through which adhesive 72 flows onto the top of the lower layer 68 as the web travels in left-to-right direction, as illustrated in FIG. 2. This forms a top adhesive layer 74 of the multilayer adhesive product. Again, for ease of illustration, the top layer 74 is shown as a darker-colored material, but this may not necessarily be the case in actual production; for instance, various colors or tags such as ultra-violet fluorescent dye may be utilized to facilitate measurement of individual layer thicknesses.

Coating of viscous adhesives at these web speed rates can involve a number of problems. For example, recirculations in the flow of either the bottom or top adhesive layers can result in certain defects in the final multilayer product. Such recirculations may occur if the separation point of either liquid adhesive with respect to the die lips 58 occurs at an inappropriate location. In addition, extreme pressure gradient can result in the upstream leakage of liquid out of the coating gap area, again causing defects in the end product due to nonuniform adhesive layer thicknesses, etc. Moreover, these and other maleffects result in the diffusion of one layer in the other, since they are being coated simultaneously in the liquid state. Such diffusing jeopardizes the integrity and performance of the resulting product.

Thus, it has been found, with respect to the multilayer die coating described herein, that it is very important to control the pressure gradients of the adhesives under each lip. In particular, the top layer should separate from the middle lip at the downstream corner of this lip. In order to achieve such coating control, it will be noted from FIG. 2 that the lips 58 of each die section are stepped or spaced away from the web 52 in the downstream direction. This allows the lips to generate the appropriate pressure gradient and to ensure smooth flow of the adhesive and uniform layer thicknesses. The adjustment of a number of run parameters are necessary in order to achieve this goal. For example, the coating gaps at lip 58b and 58c should be approximately in the range of one to three times the compounded wet film thicknesses of the layers being fed from upstream of said lip. Under the upstream lip 58a, the net flow rate is necessarily zero, and a turn-around flow is the only possibility. Thus, the coating gap under this lip is solely set in order to avoid leakage of the liquid out from the coating gap in the upstream direction. Moreover, the upstream step, defined as dimension A in FIG. 2, and the downstream step, defined as dimension B, may range anywhere from zero to four mils (0.0 inches to 0.004 inches). The feed gaps (defined as dimensions C and D in FIG. 2) can also be adjusted anywhere between one and fifteen mils (0.001 inches to 0.015 inches), preferably not to exceed five times the wet film thickness of their correspondent layers. In addition, the length of the lips 58 in the direction of web travel play an important role in achieving the proper pressure gradient. Thus, the upstream lip 58a should be approximately two millimeters in length, or more, as necessary to seal the head as noted above. The downstream lip 58c and middle lip 58b may fall within the range of 0.1–3 mm in length.

It will be recognized that one of ordinary skill in the art can adjust these various parameters in order to achieve the proper fluid dynamics for uniform layer coating. Of course, persons of more than ordinary skill can adjust the die and run parameters more precisely in order to achieve good results. However, such persons are not always readily available in production settings. Therefore, it is advantageous to provide a die geometry which will increase the size of the window of successful multilayer coating operation. This can be achieved by certain adjustments in the orientation of the die lips.

Thus, FIG. 3 illustrates the die 50 of FIG. 2 rotated slightly in the clockwise direction representing an "angle of attack α. For consistent reference, the angle of attack (α) shown in FIG. 3 represents a negative angle of attack, or a "converging" orientation of the downstream lip 58c with respect to the web 52. This converging lip orientation provides a negative pressure gradient (in the direction of web travel), along the downstream lip 58c, which is beneficial in preventing a coating defect well known as "ribbing," a pattern of regular striation in the sense of the web travel in the film. The fact that the middle and the upstream lips 58a and 58c also achieve a convergent orientation is not particularly beneficial. Although the angle of attack of the die can be varied widely in order to achieve these advantages, it has been found that angles in the rate of 0° to −5° are appropriate.

Figure 4:
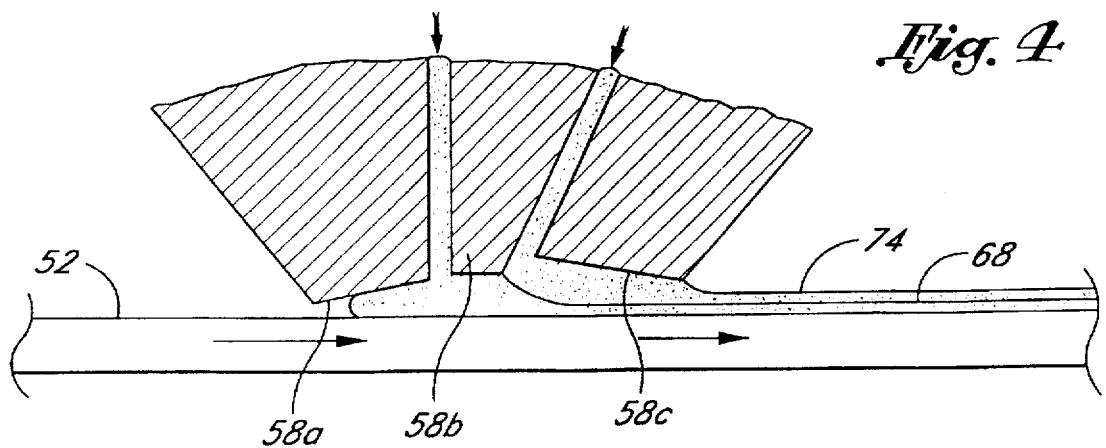
FIG. 4 is a schematic enlarged vertical cross-sectional view illustrating another embodiment of coating operation using the dual die coating system.

An even further successful operating window can be achieved with additional lip modifications. Shown in FIG. 4 is a variation of the lip configuration of FIG. 3, illustrating "beveled" lips. In this configuration, the downstream lip 58c is angled or beveled to as to have a converging profile, similar to that shown in FIG. 3. However, the middle lip 58b is positioned so as to be flat or parallel with respect to the web 52. The upstream lip 58a, on the other hand, is beveled so that it is diverging from the web 52 in the downstream direction. This configuration, again, provides the appropriate pressure gradient under the individual lips to avoid recirculations and upstream leakage. Moreover, if perturbations in the coating conditions occur (such as, for example, due to roll run-out, foreign objects on the web, variations in ambient pressure, etc.), the converging configuration of the upstream lip 58a shown in FIG. 4 will produce a dampening effect on flow conditions so that defects in the coating layers do not occur. In this manner, the multilayer coating bead acts as a nonlinear spring to dampen out such unwanted events in order to return to steady state. The die 50 can then be adjusted in accordance with standard angle of attack variations to achieve favorable coating conditions. Because the lips 58 are pre-disposed or beveled in a favorable orientation, the adjustment of angle of attack, as well as coating gap, need not be so precise. Thus, persons of ordinary skill or even less skill can successfully achieve good coating results.

It will be understood, however, by those of ordinary skill in the multilayer coating art, that multilayer die coating can be achieved in a variety of ways similar to those described above, or in other ways, and with appropriate adjustments of the various parameters for coating.

OTHER METHODS OF PREPARATION OF MULTIPLE LAYER ADHESIVE CONSTRUCTIONS

As will be readily apparent to one having ordinary skill in the art application of the dispersible and nondispersible layers can be achieved through a variety of techniques other than through the dual die technology described above. For example, the nondispersible adhesive can be applied to the face stock and the dispersible adhesive applied to a backing material using conventional techniques.

EXAMPLES

The following Examples and Controls are to illustrate the invention.

EXAMPLE 1

Adhesive Characteristics of Repulpable Dual Layer Adhesive

In the following, S-2000 is nondispersible emulsion acrylic polymer manufactured by Avery Dennison. RVH5-70B is a dispersible emulsion acrylic polymer manufactured by Avery Dennison. "PSA" means a pressure-sensitive adhesive. In Table 3, "PE" means polyethylene, "BP" means bond paper, "CB" means cardboard, and "FP" means fiber pick. In Table 4, "Z" means zippy, "PT" means paper tear, "PT" means face tear.

On a backing silicon was applied as a release coating and cured in an oven. Using a dual die, an S2000 and RVH-70B coating mixture was applied onto the silicon release coating. When forming a single layer, one of the slits of the dual die was used. A primed facestock was laminated on the PSA coating using a roller. The thus-obtained labels had the following PSA coating thereon.

TABLE 1

| S-2000 | 25.2 g/m² |
| RVH5-70B | 23.4 g/m² |
| S-2000/RVH5-70B* | 24.0 g/m² |
| S-2000 | 4.0 g/m² |
| RVH5-70B | 20.0 g/m² |

*The lamination order was S-2000/RVH5-70B/Facestock.

Results of adhesive tests are shown in Tables 2–4. Shear testing was performed based on ASTM D-3654-78 and D-1000-68 as well as PSTC (Pressure-Sensitive Tape Council) Test #7, 10th ed. PSTC Test #7 is ordinarily performed on a ½"×½" section with a 500 g load, 0 dwell at 70° C. and 100° C.; however, we performed the test at room temperature, or about 23° C. That is, a ½"×½" section of a ½"×2" pressure sensitive test specimen was affixed to the bottom portion of a stainless steel test panel. The panel was mounted into a vertical casement. A 500 g weight was attached to the lower portion of the test specimen and suspended from the panel and the test sample. The time for the ½"×½" sample to shear from the steel panel was measured.

Looptack testing was performed based on PSTC Test #7, 10th ed. That is, a label sheet was cut out to obtain a piece one inch wide and 8 inch long, and the backing was peeled off. The label was looped and allowed to touch a piece of immobilized substrate, such as cardboard or stainless steel, for approximately 1 second. The label was then vertically pulled away from the immobilized substrate, and the force to detach it from the substrate was measured.

Peel testing was performed based on 90° Peel Test by PSTC Test #1, 10th ed. (20 minute dwell). That is, the label from which the backing had peeled off was placed on a substrate, and allowed to stand for 20 minutes. The facestock was gradually peeled from an edge thereof in the 90° direction away from the substrate, and the force to peel it off was measured.

TABLE 2

| | Shear | | | |
|---|---|---|---|---|
| PSA | Shear (min) | | | Average |
| S-2000 | 40.7 | 32.4 | 38.3 | 37 |
| RVH5-70B | 82.8 | 75.6 | 98.1 | 86 |
| S-2000/RVH5-70B | 47.6 | 54.2 | 38.2 | 47 |

TABLE 3

| | Looptack | | |
|---|---|---|---|
| | Looptack (N/m) | | |
| PSA | PE | BP | CB |
| S-2000 | 363 | 424 FP | 299 |
| RVH5-70B | 160 | 206 | 104 |
| S-2000/RVH5-70B | 216 | 194 | 140 |

TABLE 4

| | Peel | | |
|---|---|---|---|
| | Peel (N/m) | | |
| PSA | PE | BP | CB |
| S-2000 | 204 | PT | 256 Z |

TABLE 4-continued

| | Peel | | |
|---|---|---|---|
| | Peel (N/m) | | |
| PSA | PE | BP | CB |
| RVH5-70B | 200 | PT | 158 Z |
| S-2000/RVH5-70B | PT | PT | FT/PT |

As clearly indicated in Tables 2–4. The single layer conventional adhesive (nondispersible) had high looptack values and low shear values, while the single layer dispersible adhesive had low looptack values and high shear values. In addition, the dispersible adhesive showed high peeling resistance although it had low looptack strengths. In contrast, the dual layer adhesive showed, as a whole, in-between characteristics, i.e., improved looptack strength relative to the single layer dispersible adhesive, and improved shear strength relative to the single layer nondispersible adhesive. In particular, the dual-layer adhesive showed improved looptack strength on cardboard.

EXAMPLE 2

Recyclability of Repulpable Dual Layer Adhesive

In the following, AT-1 is a conventional (nondispersible) emulsion acrylic polymer manufactured by Avery Dennison. S-490 is a conventional (nondispersible) emulsion acrylic polymer manufactured by Avery Dennison. S246 is a conventional (nondispersible) Kraton based polymer formulated by Avery Dennison. S-2025 is a dispersible emulsion acrylic polymer manufactured by Avery Dennison. AE3370 is a dispersible emulsion acrylic polymer manufactured by Avery Dennison.

As described in Example 1, labels were produced in which the ratio of adhesive to paper by weight was 21.7%. Using a pilot scale paper recycling operation, the recyclability of various adhesives were determined. Sampling points in the flow path of the cleaning process are indicated as follows:

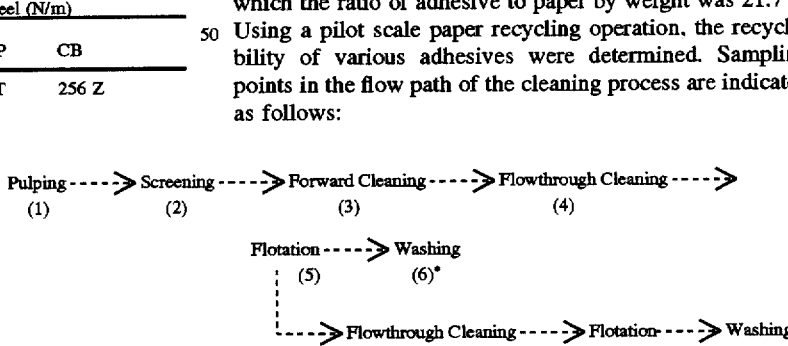

*Samples 7 and 11, when collected, were the drainage waters from the sidehill screen; used for BOD (Biological Oxygen Demand) analysis and determination of total, suspended and dissolved solids.

Adhesive contamination (stickies) level was determined by image analysis in the prepared handsheets. The average number of particles per 10 handsheets made from the recycled pulp were counted and the areas of those particles were measured in parts per million at each sampling point. Recyclable adhesives will show a particle count and size similar to that seen in the no adhesive control sample (see Table 5).

up water was placed on the other side to sandwich the dried pulp sheet, followed by pressing and heating it at 10 tons per square inch at 250° F. for about 30 seconds. After drying, the thus-obtained paper was stained with an organic dye. The paper was observed visually. In the same way, single-layer S490 (conventional PSA) was also tested.

As a result, the dual-layer adhesive showed several tens of small specks having a size of approximately 300 μm or less

TABLE 5

| PSA | | #: no. particles per 10 sheets a: area of particles (pct × E-03) | | | | | | | | |
|---|---|---|---|---|---|---|---|---|---|---|
| Sampling Points | (1A)* | (2) | (3) | (4) | (5) | (6) | (8) | (9) | (10) | |
| Control #: | | 22 | 16 | 7 | 11 | 11 | 56 | 8 | 10 | 10 |
| (copy paper) | a: | 2.55 | 3.70 | 2.20 | 1.40 | 1.66 | 7.15 | 1.38 | 1.38 | 3.20 |
| S490 | #: | 148 | 183 | 232** | 303 | 141 | 113 | 191 | 158 | 120 |
| | a: | 73.4 | 56.8 | 136. | 77.3 | 89.6 | 47.9 | 36.2 | 89.4 | 52.5 |
| S246 | #: | 98 | 124 | 145 | 186 | 84 | 77 | 97 | 71 | 48 |
| | a: | 115. | 80.0 | 137. | 100. | 63.2 | 65.4 | 53.5 | 81.3 | 26.6 |
| S2025 | #: | 39 | 44 | 29 | 38 | 26 | 22 | 28 | 18 | 22 |
| | a: | 4.22 | 7.15 | 4.48 | 7.92 | 4.94 | 4.69 | 5.06 | 2.94 | 4.04 |
| AE3370 | #: | 17 | 30 | 12 | 8 | 17 | 17 | 22 | 16 | 24 |
| | a: | 4.24 | 3.60 | 2.55 | 0.97 | 2.69 | 2.67 | 4.11 | 6.11 | 4.99 |
| Dual Layer | #: | 38 | 96 | 114 | 152 | 24 | 46 | 162 | 13 | 22 |
| | a: | 25.6 | 34.8 | 38.1 | 57.9 | 6.24 | 12.7 | 63.2 | 8.79 | 6.32 |

(1A)* was pulped stock diluted to 4% consistency, which had been sampled from sampling point (1).
**only 9 sheets analyzed; count prorated to 10 sheets. Fractional area remains same.

As clearly indicated in Table 5, the dual-layer adhesive construction showed little adhesive contamination, indicating excellent recyclability compared to the single layer dispersible adhesive constructions and the no adhesive control. This is especially relevant at the completion of the deinking sample (sample 10). Contamination is due to the presence of adhesives remaining in the defibered pulp. Thus, even though the contamination levels measured at sampling points 2–4 and 8 appeared not to be low, this fact is expected not to be critical to recyclability.

In addition, not like soluble adhesives, the BOD test (Jerry A. Nathanson, Basic Environmental Technology: Water Supply, Waste Disposal, and Pollution Control, Regents/Prentice Hall (Englewood Cliffs, N.J.: 1986) revealed that the dispersible PSA was not dissolved into solution, meaning that it is not likely to cause environmental problems.

EXAMPLE 3

Visual Speck Test

As a conventional nondispersible PSA, AT-1 was used. AT-1 is conventional (nondispersible) polymer. RVH5-70B was used as a dispersible PSA. Based on Example 1, a label was produced in which RVH5-70B was formed on the facestock at 20 g/m$^2$, AT-1 was formed thereon at 5 g/m$^2$, and the ratio of adhesive to paper was 21.7%.

The label was adhered to 150 g of paper in such a way that the weight of adhesive was 1% based on the weight of the paper. This was added to a pulping mill with water so that the solid content was adjusted to 4%. The pH of the solution was adjusted to 8 using 0.5% NaOH. Pulping was conducted at 100° F. for 30 minutes. After pulping the paper, the stock was placed in a beaker filled with water. After sampling, the sample was poured onto a mat filter (Whatman No. 4), and dried by suction. A polished chrome metal plate was placed on the dried pulp sheet, and a piece of blotter paper to soak on the paper, while the conventional adhesive showed several large specks having a size of approximately 5000 μm or more. Small particulate contamination can be effectively removed in the deinking process. The test results above indicate that the dual layer adhesive construction will yield a lower contaminant, higher quality paper pulp after deinking compared to conventional pressure-sensitive adhesive constructions, while at the same time providing adequate adhesion.

We claim:

1. A pressure-sensitive adhesive construction repulpable in paper recycling operations, comprising:

a facestock which is repulpable, said facestock having a face side and a back side;

a dispersible pressure-sensitive adhesive comprising tacky emulsion polymers dispersible in water; and a nondispersible pressure-sensitive adhesive adjacent to said dispersible pressure-sensitive adhesive, said nondispersible pressure-sensitive adhesive comprising tacky emulsion polymers not dispersible in water, each of said dispersible and nondispersible pressure-sensitive adhesives being on said back side of said facestock, said adhesives being a laminate structure with each other.

2. The pressure-sensitive adhesive construction according to claim 1, wherein the weight ratio of said nondispersible pressure-sensitive adhesive to said dispersible pressure-sensitive adhesive is 1/7 to 1/2.

3. The pressure-sensitive adhesive construction according to claim 2, wherein said ratio is 1/4 to 1/5.

4. The pressure-sensitive adhesive construction according to claim 1, wherein the coatweight of said dispersible pressure-sensitive adhesive is 15 g/m$^2$ to 30 g/m$^2$, and that of said nondispersible pressure-sensitive adhesive is 2 g/m$^2$ to 15 g/m$^2$.

5. The pressure-sensitive adhesive construction according to claim 4, wherein the coatweight of dispersible pressure-sensitive adhesive is 18 g/m² to 22 g/m², and that of said nondispersible pressure-sensitive adhesive is 4 g/m² to 6 g/m².

6. The pressure-sensitive adhesive construction according to claim 1, wherein said dispersible pressure-sensitive adhesive contains emulsion polymers formed by emulsion polymerization and having a backbone of from about 80% to about 90% by weight of nonacid monomers, interpolymerized with from about 10% to about 20% by weight with a blend of acrylic acid monomers.

7. The pressure-sensitive adhesive construction according to claim 1, wherein said nondispersible pressure-sensitive adhesive is a permanent nondispersible pressure-sensitive adhesive.

8. The pressure-sensitive adhesive construction according to claim 1, wherein said nondispersible pressure-sensitive adhesive has a glass transition temperature 5°–15° C. lower than that of said dispersible pressure-sensitive adhesive.

9. The pressure-sensitive adhesive construction according to claim 1, wherein said dispersible pressure-sensitive adhesive and nondispersible pressure-sensitive are coatable from the same die.

10. The pressure-sensitive adhesive construction according to claim 1, additionally comprising a removable backing material.

11. The pressure-sensitive adhesive construction of claim 1, wherein the dispersible pressure-sensitive adhesive is closer to the back side of the facestock than the nondispersible pressure-sensitive adhesive.

* * * * *